United States Patent [19]

Margolis

[11] Patent Number: 5,576,047
[45] Date of Patent: Nov. 19, 1996

[54] METHOD TO PRODUCE A COOKED, LOW FAT GROUND MEAT PRODUCT

[76] Inventor: Geoffrey Margolis, 12229 Falkirk La., Los Angeles, Calif. 90049

[21] Appl. No.: 304,381

[22] Filed: Sep. 9, 1994

[51] Int. Cl.⁶ .................... A23L 1/314; A23L 1/317
[52] U.S. Cl. .......................... 426/646; 426/417
[58] Field of Search ................. 426/646, 417, 426/478

[56] References Cited

U.S. PATENT DOCUMENTS

| | | |
|---|---|---|
| 452,213 | 5/1891 | Castanos et al. . |
| 754,310 | 3/1904 | Horne . |
| 1,620,567 | 3/1927 | Navarre .................... 100/210 |
| 1,656,662 | 11/1926 | Carter et al. . |
| 2,355,548 | 8/1944 | Musher .................... 426/646 |
| 2,803,634 | 8/1957 | Chayen . |
| 2,984,360 | 5/1961 | Smith . |
| 3,125,019 | 3/1964 | Ackerman .................... 100/158 |
| 3,177,080 | 4/1965 | Alberts .................... 426/233 |
| 3,457,853 | 7/1969 | Morley .................... 99/349 |
| 3,603,240 | 9/1971 | McCarthy .................... 99/251 |
| 3,682,655 | 8/1972 | Touba . |
| 3,739,712 | 6/1973 | Duning .................... 99/349 |
| 3,780,191 | 12/1973 | Langer et al. .................... 426/646 X |
| 3,802,635 | 4/1974 | Drisschel .................... 241/282 |
| 3,818,824 | 6/1974 | Kloda et al. .................... 100/116 |
| 3,949,659 | 4/1976 | Hunt .................... 99/348 |
| 3,965,807 | 6/1976 | Baker .................... 99/375 |
| 4,346,653 | 8/1982 | Rodak .................... 100/37 |
| 4,352,324 | 10/1982 | Noh . |
| 4,601,237 | 7/1986 | Harter et al. .................... 99/349 |
| 4,667,589 | 5/1987 | Bishop .................... 99/386 |
| 4,818,557 | 4/1989 | Conrad .................... 426/646 X |
| 4,846,054 | 7/1989 | Mange et al. .................... 99/495 |
| 4,847,099 | 7/1989 | Elinsky .................... 426/233 |
| 4,948,607 | 8/1990 | Margolis .................... 426/281 |
| 4,980,185 | 12/1990 | Small .................... 426/417 |
| 5,082,678 | 1/1992 | Margolis .................... 426/281 |
| 5,116,633 | 5/1992 | Small .................... 426/641 |
| 5,167,977 | 12/1992 | Gamay .................... 426/417 |
| 5,168,800 | 12/1992 | Margolis .................... 99/495 |
| 5,189,946 | 3/1993 | Leon . |
| 5,286,514 | 2/1994 | Webb et al. .................... 426/646 |
| 5,397,585 | 3/1995 | Abernathy .................... 426/417 |
| 5,405,632 | 4/1995 | Mahboob .................... 426/646 X |

FOREIGN PATENT DOCUMENTS 770153  10/1967  Canada .................... 100/37

*Primary Examiner*—Arthur L. Corbin
*Attorney, Agent, or Firm*—Loeb & Loeb LLP

[57] ABSTRACT

A method and system for producing low fat ground meat is disclosed. The method relates to a method of cooking raw ground meat so as to form a mixture that includes cooked ground meat, liquified fat and broth. Hot water is added to the mixture in an amount sufficient to cause a significant percentage of the liquified fat to float above the surface of the cooked meat mixture. The liquified fat layer is then removed. Subsequently, broth and water are also removed such that a cooked, low fat, chunky ground meat product results. The system comprises a specifically configured cooking vessel into which is selectively placed a fat removal apparatus. The apparatus comprises a series of tubes which are arranged and configured to remove liquified fat from the meat after cooking.

8 Claims, 12 Drawing Sheets

METHOD TO PRODUCE A COOKED, LOW FAT GROUND MEAT PRODUCT

FIELD OF THE INVENTION

This invention is directed to a method for producing low fat cooked ground meat, employing a density differential fat separation process and related apparatus.

BACKGROUND OF THE INVENTION

In recent years, public concern regarding diet, in particular, fat intake, has dramatically increased. The focus on fat intake is particularly important as it has been found to relate to heart disease and other ailments, which are believed to afflict a large percentage of individuals throughout the world.

Blood cholesterol levels have been recognized as a major factor in determining whether an individual will suffer from heart disease. A major factor contributing to a relatively high blood cholesterol level is a high dietary intake of saturated fats.

The American Heart Association ("AHA") has recommended that, to reduce the risk of heart disease and cancer, individuals should reduce their daily dietary intake of fats and cholesterol. Specifically, the AHA has recommended (1) that individuals receive only 30% of their daily caloric intake from fat with only 10% of that amount being derived from saturated fat, and (2) that dietary cholesterol intake be kept below 300 milligrams per day.

To aid individuals in achieving these AHA recommendations, many consumer products, such as low fat cookbooks and low fat foods, are currently on the market. Nonetheless, many individuals avail themselves of the conveniences gained by eating in restaurants or ordering food from take-out restaurants. Unfortunately, many foods served in some of these establishments are relatively high in fat, due to the use of high fat meats.

The restaurant and food processing industry is aware of the growing public dietary conscience. Indeed, many restaurants have begun to offer low fat products on their menus. However, there is a concern that the removal of fat will adversely affect the taste of the food product and/or will add costly steps to food processing system. Several approaches have been utilized in attempts to produce low fat meat products. One approach is to simply use low fat meat. This approach suffers in that the product is expensive due to the relatively high cost of low fat meat. Further, low fat meats tend to be less "juicy" and less tasty because of the lack of fat present when cooking the meat.

Another approach that can be used to manufacture low fat meat is cook meat of high fat content and then separate the rendered fat produced during the cooking step. This approach, unfortunately, also suffers from various problems. In particular, separating the fat from the meat is extremely difficult and expensive on a large industrial scale because cooked meat forms an interwoven "matrix" that tends to hold the rendered fat, making draining difficult, as well as, time consuming. Further, even if separation of the fat can be achieved, this approach results in a low yield weight of low fat meat, since, much of the initial raw meat weight is lost in the fat removal step. This increases the cost of the processed meat.

Various attempts at removing fat content from meats have been explored. For instance, U.S. Pat. Nos. 4,980,185 and 5,116,633 to Small are directed to a method for making meat products having a reduced saturated fat and cholesterol content. Heated unsaturated oil is added to raw meat. The heated unsaturated oil acts as an extracting agent for cholesterol. Further, due to the heated oil, fats in the meat melt and become soluble. The heated oil containing the cholesterol and fat is separated from the meat with a heated aqueous fluid. According to these patents, fat content is reduced from 20.8% to 18.5% and cholesterol is reduced from 115 mg to 80 mg of cholesterol per 100 g of beef.

U.S. Pat. No. 3,949,659 to Hunt is directed to an apparatus and related method for processing meat. In the Hunt apparatus, a large vat is equipped such that fat can be separated from cooked meat. However, the Hunt apparatus and method utilize a pressing force to remove fat from meat. This can adversely impact on the texture and other qualities of the meat.

U.S. Pat. No. 4,847,099 to Elinsky is directed to an apparatus and method for defatting and cooking meats where the meat is suspended above boiling water and exposed to steam. During cooking the fat from the meat drips off into the boiling water. However, such process and related apparatus is not believed to produce the "juicy" meat product and/or taste which would have wide consumer appeal. The present inventor has proposed other fat removing techniques. For example, U.S. Pat. No. 4,948,607 to Margolis is directed to a method and apparatus for removing fat from a preformed meat patty by applying pressure to a cooked patty sufficient to exude a substantial portion of liquified fat from the product. While such process and apparatus work well, they are not designed to make a ground, i.e., crumbly, low fat meat product.

Further still, some of these processes can be relatively expensive and time consuming. Indeed, some of these processes can also adversely affect the texture and taste of the product. Moreover, the amount of fat removal tends to be either insufficient or tends to cause a significant reduction in the overall product yield. Thus, there is a need in the industry for an improved system of removing fat from a food product that minimizes adverse affects on the texture and taste of the product, that is relatively simple and cost effective and that does not significantly reduce (or reduce at all) the overall product yield.

SUMMARY OF THE INVENTION

This application is related to a copending application entitled FAT REMOVAL PROCESS FOR GROUND MEAT USING DRAINING, filed under Attorney Docket Number PD3364 and incorporated herein by reference.

An object of the present invention is to provide a method and apparatus for reducing the fat content in meat, preferably to about 10% or less.

A further objective of the present invention is to provide a method and apparatus that produces a meat product with reduced fat content, in an economical manner, that has a taste and texture acceptable to consumers.

Yet another objective of the present invention is to provide an apparatus that allows fat separation to be easily performed in industrially available cookers.

These and other objectives are within the scope of the present invention.

The present invention relates to a method and apparatus for producing low fat ground meat. The method comprises the steps of first cooking the meat to liquify the fat in the meat and produce a mixture of cooked ground meat and a liquid fat/broth phase.

The liquid fat/broth phase is then separated from the cooked ground meat through the addition of a small quantity of water to meat/fat/broth mixture. The added water establishes a fluid density differential between the meat and the fat, permitting a rapid separation of the fat into a generally continuous layer above the meat.

One preferred apparatus embodiment, adapted to current cooker designs, employs a system to add the water into the cooking vessel and a plurality of pipes through which the liquid fat phase is removed. A screened box element placed within the cooked meat phase is also utilized to remove excess added water.

In one embodiment, the addition of a water absorbent (and flavoring, if necessary) after the separation of the liquid phase substantially increases the overall yield of the resulting meat product.

By the use of the method and apparatus of the present invention, a meat product with a fat content of about 10% or less, and a weight approximately equal to or greater than the weight of the raw ground meat prior to cooking, can be achieved.

The process of the present invention can best be understood by reference to the examples and figures. However, the examples are intended to be illustrative and not to be construed so as to limit the invention as set forth in the claims and specification.

DETAILED DESCRIPTION OF THE INVENTION

Figure 1:
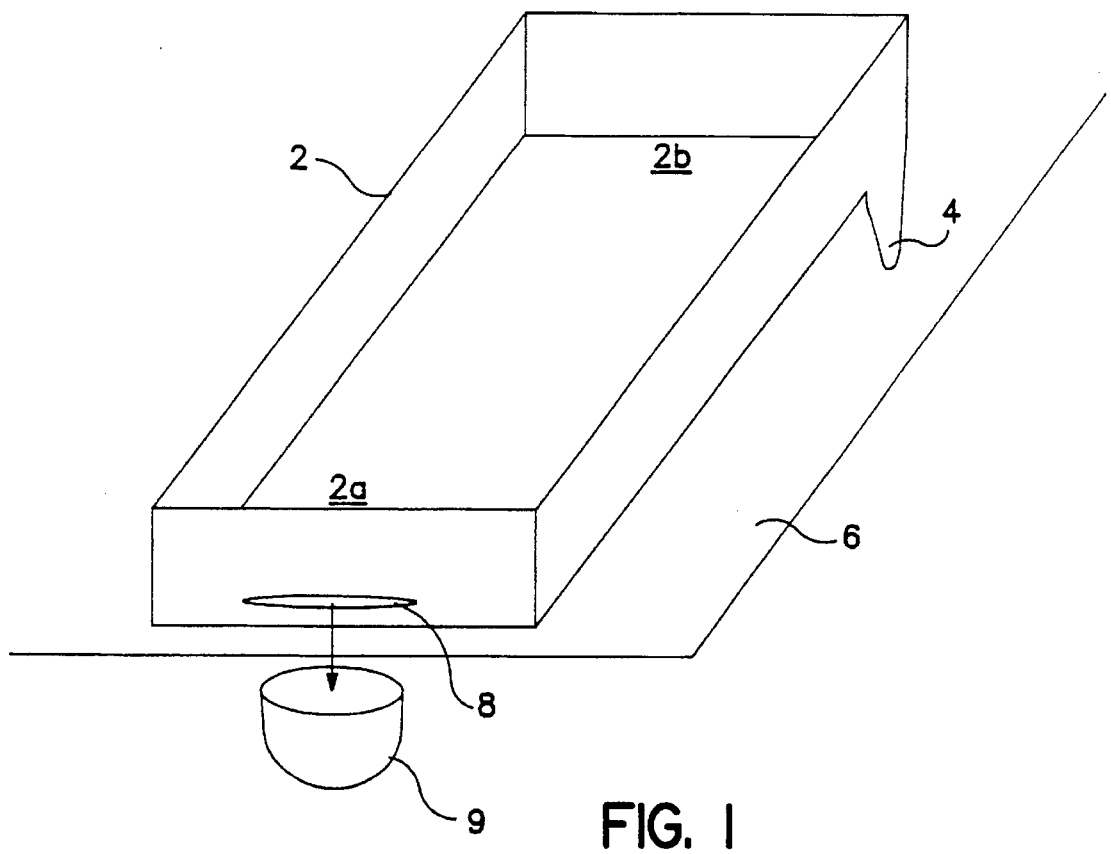
FIG. 1 depicts a side view of a first embodiment of the fat extraction apparatus of the present invention.

It is well known that the cooking of raw ground meat produces a mixture of solid "chunky" cooked ground meat and a liquid phase consisting of liquified fat and water based broth formed during the denaturization (cooking) of the meat proteins.

Surprisingly, it has been discovered (see Example 2 below) that, after separation of the liquid phase, the cooked ground meat is not only low in fat content, but also only contains only about 8 grams of fat for every 100 grams of raw meat cooked, irrespective of the initial fat content of the raw ground meat.

Thus, according to the present invention, low fat (10 to 12% by weight fat) cooked ground meat can be produced from almost any percent fat raw meat, and in particular, from inexpensive high fat (~25% weight) raw meat—provided, of course, that the rendered liquid phase can be separated from the cooked meat.

At the small "kitchen" scale, separation of the liquid phase is easily achieved due to the relatively small quantity of meat (1 to 2 lbs.) that is generally cooked in a skillet of relatively large heated surface area (~100 inches squared). Thus, when the meat is distributed over the heated surface, it has an average bed depth of generally substantially less than about 1 inch. This thin bed of meat cooks quickly (in 5 to 10 minutes) and allows the rendered fat to easily drain and separate from the meat.

On the other hand, at industrial scale, large quantities (500 to 4000 lbs.) of raw ground meat need to be efficiently cooked in less than about 60 minutes per batch. This is generally achieved by processing meat in either horizontal or vertical cookers fitted internally with various types of agitator ribbons or blades.

These agitators are designed to continuously circulate meat from the central region of the cooker to its outer heated walls and then back to the central region. By using this design approach, the heated surface area of the cooker is brought into frequent and rapid contact with the entire meat block, thus permitting the meat to be rapidly cooked. In this manner, a much smaller heated surface area to meat volume ratio (ranging from 1 to 3 $ft^{-1}$) than the so-called "kitchen" scale operation (with a surface to volume ratio ranging from 20 to 40 $ft^{-1}$) is used to cook large quantities of meat (see Table 1 below).

TABLE 1

Surface to volume ratios of typical "Industrial Scale" cookers as compared to "Kitchen Scale" cookers

| PROCESS AND MEAT QUANTITY COOKED | Approx. Major Dimensions of Processor | | | Heated Surface Area $ft^2$ "A" | Meat Volume* $ft^3$ "V" | $\frac{A}{V}$ $ft^{-1}$ |
|---|---|---|---|---|---|---|
| | Length ft. | Width ft. | Meat bed depth ft | | | |
| 1  "Kitchen" Operation | | | | | | |
| 1 lb meat | 0.8 | 0.8 | <0.08 | 0.64 | 0.016 | 40 |
| 2 lb meat | 0.8 | 0.8 | <0.08 | 0.64 | 0.032 | 20 |
| 2  "Industrial" Scale Operation | | | | | | |
| 450 lb meat | 4.0 | 2.5 | ~1.0 | 18** | 7 | 2.6 |
| 2500 lb meat | 7.0 | ~3.5 | ~1.25 | 42** | 40 | 1.0 |
| 4000 lb meat | 11.0 | ~4.0 | ~1.75 | 82** | 65 | 1.3 |

*Calculated by multiplying meat weight by raw meat density
**Based on approximate industrial scale processor design dimensions Most large scale industrial cookers are of the horizontal type, with heated outer walls and two motor driven adjacent, horizontal ribbon blender type agitators traversing the entire length of the cooker. The cookers are very compact in size, due to the use of small heated surface area to meat volume ratios. For example, the horizontal Blentech VersaTherm blending cooker Model TP-28133 (manufactured by Blentech Corp., Rohnert Park, Calif.) can cook approximately 4000 to 5000 lbs. of raw ground meat in less than 60 minutes, yet is only 11 ft long and approximately 4 ft. wide by 4 ft. deep.

The compact design of industrial cookers has major economic advantages, but, unfortunately, the small surface to volume ratio of these cookers result in dramatic increases (to about 2 feet) in meat bed depth causing significant problems if used for fat separation.

Thus, in contrast to the "kitchen" scale operation where both cooking and fat separation are easily achieved, industrial scale cookers are designed for efficient cooking but not for ease of fat separation.

DETAILS OF THE FAT SEPARATION METHOD OF THE PRESENT INVENTION

The present invention utilizes the range of density differences between cooked ground meat, liquified fat and water to efficiently separate fat from meat.

It is well known that liquified fat has a lower density (approximately 0.95 gms./ml.) than water. Surprisingly, however, the density of cooked ground meat (approximately 1.07 to 1.08 gms./ml.) has been found to be higher than that of pure water due to its unique composition. (See Table 2 below). This higher density can be attributed to the presence of protein (density 1.4 gms/ml.) which more than offsets the less dense fat (density 0.95 gms./ml.).

TABLE 2

| The approximate composition of cooked ground meat. | |
| --- | --- |
| Component | Wt. % |
| Water | 65–70% |
| Protein | 18–22% |
| Fat | 10–13% |

The fat separation method of the present invention capitalizes on the small but significant density differences between cooked meat, fat and water. Thus, when sufficient quantities of water (density: 1.0 gms./ml.) are added to a mixture of cooked meat and fat, the cooked ground meat (density: 1.07 gms./ml.) will sink while the fat (density: 0.95 gms./ml) will float—resulting in a meat/fat separation.

According to the present invention, raw ground meat is first cooked in a cooking vessel, producing a mixture of cooked meat, liquified fat and water based broth.

Hot water is then added in sufficient quantity to the above-mentioned mixture until a liquid water layer is formed above the cooked meat level. The rendered fat rapidly separates from the mixture and floats to the water surface. On the other hand, the cooked meat sinks in the water phase. As a consequence, the water level remains above the submerged meat.

The fat particles which float to the water surface coalesce into a generally continuous fat layer, which can then be removed by suction displacement over a weir or other means.

Accordingly, the addition of water, as disclosed by the present invention, plays two roles in enhancing fat separation: first, it provides a density difference driving force for separation, and second, by providing a liquid level above the meat to which the fat floats, it physically separates the fat from the meat.

The method of the present invention is fast and efficient. For example, about 88 lbs. of fat can be separated in 6 to 7 minutes from a cooked batch of 450 lbs. of raw ground meat containing ~25% weight fat. This represents a 79% by weight separation of the incoming fat content of the meat, yet only requires about 270 lbs. of water to effect the separation ( see Example 1 below). It should be understood that by the use of this invention, at least about 60% by weight of the fat is caused to float above the cooked meat mixture.

The surprisingly low quantity of water required for fat separation by such method, is also a consequence of the packing characteristics of raw ground meat. Raw ground meat with a water content of about 70% has a solid density close to that of water, i.e. 1.0 to 1.08 gms/ml. ). However, experiments demonstrate (see Example 3 below) that the "packed" or bulk density of raw meat when placed in a vessel (such as a cooker) is very similar to its solid density. It is believed that, due to its soft and pliable nature, the raw ground meat packs into a bed with very few interstices.

As a consequence, when the meat cooks and the proteins denature forming small "chunks", the liquified fat and broth essentially fill the interstices formed during the cooking process.

Thus, the minimum quantity of water required to displace the fat phase above the meat level is approximately equal to the quantity of displaced fat. Due to water evaporation during cooking, and the fact that the meat level is not absolutely flat, the water quantity required for proper fat separation may be somewhat more than the minimum, but still substantially lower than the initial raw meat weight.

DETAILED DESCRIPTION OF THE METHOD STEPS OF THE PRESENT INVENTION

The method to produce cooked low fat ground meat by the present invention comprises first the step of cooking ground meat in a commercial cooker to a temperature greater than about 165° F.—sufficient to both cook the meat, and cause the fat in the ground meat to liquify. The liquid fat phase produced during the cooking step is then separated in situ from the meat by the addition of a small quantity of hot water, sufficient to cause the fat to both separate from and float above the meat. The separated fat is then removed by suction or other similar means.

Figure 3:
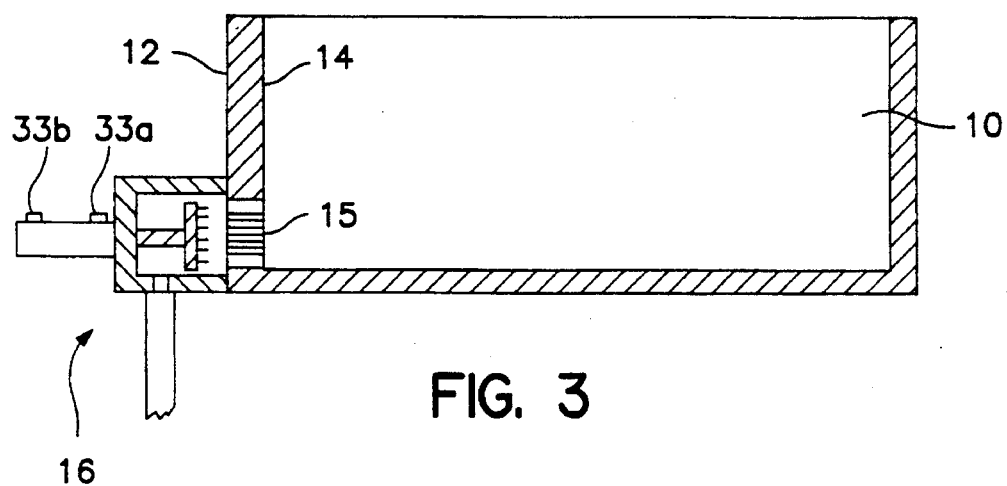
FIG. 3 is a schematic flow chart illustrating the first embodiment of the present invention.

A further step of the method is to add a flavored water absorbent to the cooked meat such that the yield of the meat product obtained from the process is substantially increased. FIG. 3 illustrates an example of the above described process.

In FIG. 3, a quantity of a food product (described herein for convenience as 100 lbs. of ground meat with about 25% weight fat by weight) is cooked by a suitable cooking process. The cooking results in a mixture of cooked ground meat, liquid fat and broth. In order to separate the fat from this mixture, about 60 lbs of hot water is then added. The fat separation process removes essentially all the liquid fat (about 19 lbs) together with about 39 lbs of broth. 9.8 lbs. of water absorbent and flavoring (consisting of approximately 50% flavoring and 50% water absorbent) is then added to the meat/broth mixture and the entire meat/broth/ flavoring/water absorber is agitated to thoroughly mix the various ingredients together. About 110 lbs of cooked low fat meat is produced with a fat content of between 6 to 8% fat by weight.

The initial meat used for cooking can contain almost any percentage of fat content, including, but not limited to, the maximum of 30% fat as allowed by the USDA. Indeed, the higher the initial fat content, the more economical the process becomes as the initial cost of the meat is less for meat with higher fat content.

To separate the liquid fat phase from the meat mixture, which includes the cooked meat, liquid fat and broth, the addition of hot water is required, that is, water at a temperature greater than about 180° F. Hot water is rapidly added to the meat mixture until the liquid level in the meat mixture is equal to or slightly higher than the meat level. Since the density of the cooked meat is greater than the density of both the water and the density of fat, the meat sinks in the water phase, while the fat phase having a density lighter than water, floats above the water phase.

The hot water and meat mixture is initially agitated for a short period of time to assist in the separation of the fat phase from the meat phase, and sufficient quantity of water is continued to be added until a distinct liquid fat layer is formed above the meat level.

After the predetermined quantity of hot water has been added to the meat mixture, there is a short waiting period, to permit any small fat particles to coalesce and rise into the fat layer. The majority of the fat layer is then suctioned off. The meat mixture is then briefly agitated again to release any remaining fat particles clinging to the meat and the remaining fat and broth are then suctioned off by a second set of suction tubes. Finally, the water based broth is partially removed by the third suction tubes through the screened box element that is placed below the meat surface. The remaining meat flavored broth is used for mixing with the flavoring and water absorbent mixture and is used to flavor the low fat ground meat and increase product yield.

In other embodiments, weirs or suction ports are built into the cooker. By placing the weirs or suction ports at appropriate levels, the liquid phase is separated from the meat mixture.

The separation of the liquid phase produces ground meat that contains approximately 10–13% by weight fat content, but may be aptly about 60–75% by weight of the initial volume of raw meat. The resulting fat content of the cooked meat is essentially the same irrespective of the percentage of fat content in the starting raw ground meat. The higher the fat content of the starting meat, the greater the amount of fat produced in the liquid phase and the lower the yield of cooked meat. In particular, the cooking and separation steps cause the bulk content of the initial meat to decrease such that only 60–75% by weight of the initial bulk weight of the starting raw ground meat remains after cooking and liquid phase separation.

To increase and replace bulk content of the meat product, a water absorbent is added to the low-fat, cooked, ground meat. In preferred embodiments, the water absorbent is a solid, fibrous material, added to the meat in a dry or semi-dry form. The water absorbent combines with the liquid broth (water and remaining fat) remaining in the low fat meat.

In addition to the water absorbent, a flavoring, e.g., a taco flavor, is also generally added to the meat.

The addition of a water absorbent and flavoring not only flavors the meat, but, depending on the amount added, can increase the yield of meat to about 110% of the starting bulk weight. This results in a gain of the yield of meat product from the initial uncooked meat. In addition, because flavoring is added after the cooking and fat removal steps, flavoring is not lost during cooking or fat removal. Further, the addition of water absorbent, by increasing the product yield without adding fat, further diminishes the percentage of fat in the overall product. Accordingly, the addition of water absorbent can affect a further reduction in the percentage of fat in the overall meat product to about 4.5–8% by weight.

Preferably, the water absorbent is capable of absorbing a large amount of water and/or broth per unit weight of absorbent. A preferred water absorbent is one which is capable of absorbing at least 6–7.5 lbs water per lb of absorbent.

Due to the ability of the absorbent to absorb large amounts of water relative to the unit weight of the absorbent, only a small quantity of absorbent is required, for example, approximately 5% by weight of the weight of the raw ground meat. The use of a small amount of absorbent minimizes any negative impact the water absorbent may otherwise have on product taste. Further, the use of a small amount of absorbent minimizes the cost of the process.

The water absorbent can be any suitable product capable of absorbing large quantities of water or broth relative to its weight. It is preferable that the water absorbent is solid to enhance the "chunkiness" of the meat product. A "chunky" texture is preferred for certain meat products, such as meat products used as taco meat products. Further, it is preferable that the water absorbent be a natural food, such as for example, but not limited to, oat flakes, oat fiber, wheat fiber, cereals etc.

DETAILED DESCRIPTION OF THE FAT SEPARATION APPARATUS

One embodiment of the present invention relates to an apparatus that can be used (in situ, if desired) in industrial scale cookers for fat separation from cooked meat products.

Referring to FIG. 1, the fat separation apparatus 10 is shown within the general outline of a container 12. The container 12 may be, for example, a cooking vessel for holding a food product (such as ground meat). In other embodiments, the container 12 may simply be any suitable vessel for holding food products (not necessarily a cooking vessel). A preferred embodiment for container 12 is a Blentech VersaTherm blender cooker.

The apparatus 10 includes a set of hollow suction tubes 14, 16 and 18, each coupled to a suction source (not shown). Tube 14 opens at its lower end into a box-like structure 20 having a hollow interior and at least one screen-mesh wall 22. The box-like structure 20 is located below a first selected level L3. Tube 16 opens at its lower end just below a second selected level L2 above L3, and tube 18 opens at its lower end just below a third selected level L1 located above L2 and L3.

A second set of hollow suction tubes 14', 16' and 18' and a box-like structure 20', with screened wall 22, respectively, are also shown in FIG. 1, and are similar in structure and function as tubes 14, 16, 18 and structure 20. Finally, the apparatus 4 includes two water feed tubes 24 and 24', through which water can be fed directly into the container.

It will be understood that other embodiments of the invention may employ other number of sets of tubes. The tubes and box-like structures are coupled together by suitable brackets 26, 28 and 28'. In one preferred embodiment, the entire apparatus 10 is coupled to a mechanical lift for lowering the apparatus into the container 12 and for lifting the apparatus out of container 12. Alternatively, the apparatus 10 may be moved as individual components or as a whole, mechanically or manually, or may be fixed in place on a safety grid 30, as shown in FIG. 2.

Figure 2A:
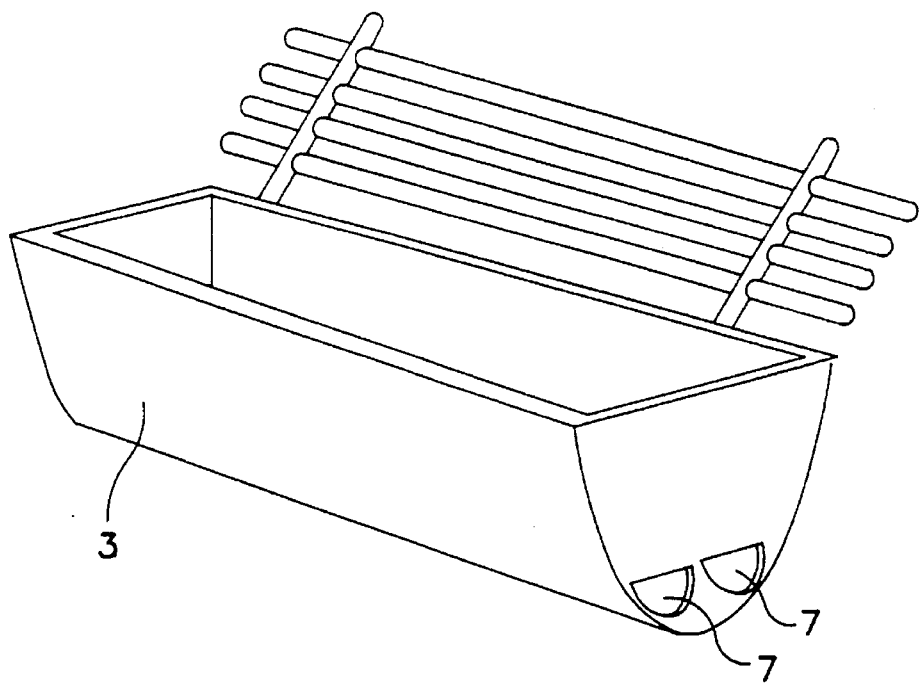
FIG. 2 is a three dimensional representation of the first embodiment of the extracting system located within a cooker.
Figure 2B:
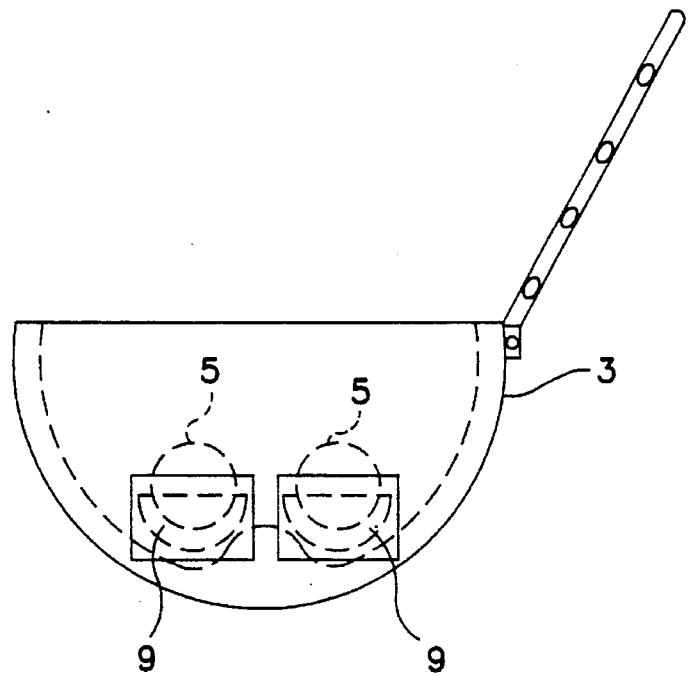
Figure 2C:
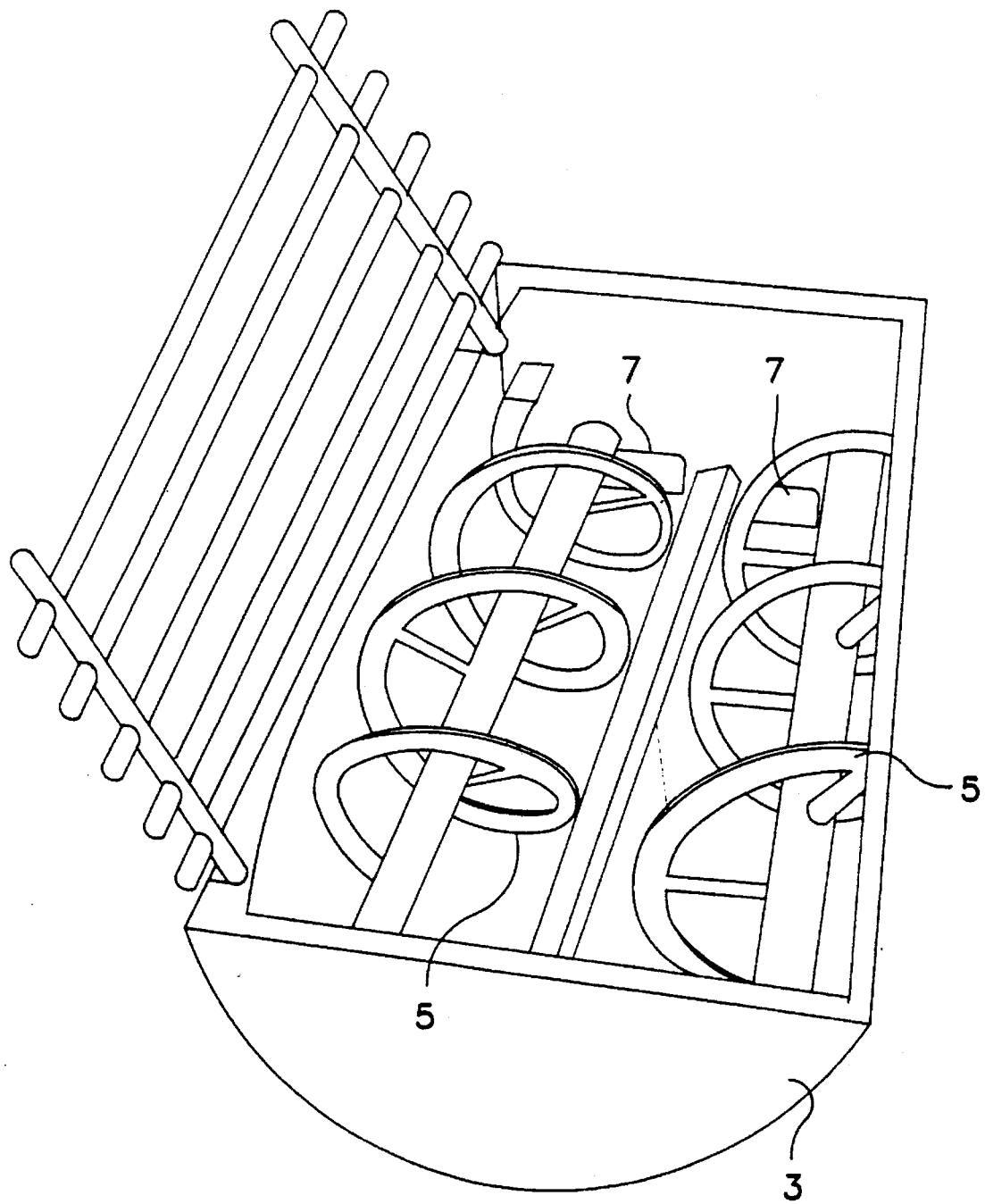

When container 10 is designed as a cooker, as shown in FIG. 2, the main body element 32 further defines a main cavity 34 in which meat (not shown) is placed for processing. In such configuration, container 10 contains drainage doors 36 for emptying the container 10 after processing has been completed. The main cavity 34 of container 10 is frequently covered with safety grid 30 and pivot connections 38 and a solid lid (not shown) to enclose the meat within the main cavity 34 so as to permit cooking under sanitary conditions. Generally the outer wall surfaces of the main cavity 34 are jacketed, and steam or other heating media is passed through the jacket in order to heat the outer wall surfaces, thus supplying the heat necessary for cooking. The quantity of energy supplied to the outer jacket is generally controlled automatically based on bulk temperature measurements of the meat made by a thermocouple passing through a surface wall of the container 10 and placed into the cooking meat mass.

Horizontal motor driven blending agitators 40 and 40' continuously move the meat from the center of the cooker to the outer heated walls during the cooking operation.

In a preferred embodiment, the lid and safety grid 30 are first opened (i.e. placed in a vertical position) and raw meat is placed within container 10 with the blender agitators moving at slow speed to uniformly disperse the meat throughout the main cavity 34. The safety grid and lid are then closed and energy is applied to the heating jacket so as to cook the meat within the cooker. During the cooking period the meat is agitated and blended (by 40 and 40') until the meat reaches a predetermined temperature (generally greater than 165° F.). At the end of the cooking cycle, the lid and safety grid of the cooker are opened, and the apparatus 10 (of the type shown in side view in FIG. 1) is attached to the underside of the safety grid 30 which is then returned to its original horizontal position, thereby fixing and lowering apparatus 10 into the main cavity element 34. The desired level of apparatus 10 is such that the meat/fat/broth mixture reaches approximately between level L2 and L3 as shown in FIG. 1. The apparatus 10 is preferably located equidistant and adjacent to each of the horizontal agitator ribbons 40 and 40', as shown in FIG. 2. For ease of description, however, FIG. 2 does not show the safety grid in its horizontal position holding the apparatus 10 in the position defined above.

Hot water is then added to the meat/fat/broth mixture through tubes 24 and 24' until the liquid level of fat (which has already partly separated and floated to the water surface) reaches level L0 (a level which is above L1, L2 and L3).

Due to a density driving force, as discussed above, the fat rapidly separates from the cooked meat and coalesces (over a period of 1 to 2 minutes) into a generally continuous layer floating on top of the meat. The first suction tubes 18 and 18' disposed just below level L1 (below the top of the meat level) are then used to extract the majority of the fat that has separated from the meat.

After further agitation of the meat/fat/broth mixture and a brief (e.g., 10 seconds) coalescing time, the remainder of the separated fat together with some broth is sucked out through tubes 16 and 16', whose ends reside at level L2 which is below the top of the meat level.

The third set of suction tubes 14 and 14' extracts excess water and broth from below the meat surface which is located between levels L2 and L3. To inhibit meat from being suctioned out of the vessel, the third set of suction tubes 14 and 14' extracts the water/broth from the screened box element 20 and 20' which are located within the main meat mass. The screened box elements 20 and 20' allow water/broth to enter the box, through screens 22, 22', but inhibits meat from entering as the screen mesh is small enough such that meat is prevented from passing into the screened box elements 20 and 20'.

Upon completion of the fat separation process, apparatus 10 is removed from the main body element 34 (by lifting the safety grid 30 into the vertical -open- position and then removing the apparatus 10 from the grid) prior to addition of any flavorings or water absorbents.

EXAMPLES

Example 1

The meat employed in this example was ground beef having an initial weight of 453 lbs and an initial fat concentration of approximately 25% by weight. The initial fat concentration was determined by standard laboratory analysis procedures.

A Blentech Model 1548 VersaTherm blending cooker was utilized in this example. The safety grid and lid of the cooker were opened (i.e. moved from the closed horizontal position to a vertical open position) and the above-mentioned meat was placed within the cooking vessel while the blender agitators were operating in slow motion to distribute the meat evenly throughout the cooker. The safety grid and lid were then returned to the closed horizontal position thereby enclosing the meat within the VersaTherm cooker, and the blender agitators increased in speed for the cooking step.

Steam having a pressure of about 36 psi was used as the heating medium for cooking. The moment the blender agitators were activated (during addition of the meat to the cooker) steam started to flow into the heating jacket of the cooker, and the steam flow to the jacket was automatically controlled throughout the entire cooking process based upon continuous thermocouple temperature measurements of the meat being cooked within the cooker.

The cooking step was automatically terminated (by shutting off the steam to the heating jacket) when the meat temperature reached 165° F. to 170° F. The meat temperature was confirmed manually by using a long stem dial thermometer to measure the temperature at several locations in the meat mixture.

The lid and safety grid of the Blentech cooker was then opened (i.e. placed in a vertical position) and fat separation apparatus 10 (of type shown in FIG. 1) was manually attached to the safety grid 30, so that upon relocating the grid to its original horizontal position, the fat separation apparatus rested between and adjacent to the two ribbon agitators, and at the correct depth within the meat mixture.

Flexible hoses were attached to tubes 24 and 24' and 270 lbs. of water at 185 degrees F. were pumped into the meat mixture over a period of about 2 minutes. The meat was agitated for the initial 20 to 30 seconds of the water addition, to assist in the separation of the fat particles from the meat.

After the hot water had been added, there was a waiting period of approximately 1.5 minutes to permit separation of any water from the fat globules and to allow coalescence of the fat globules into a continuous fat layer.

During this waiting period, hoses were attached to suction tubes 18 and 18' and at the termination of the waiting period, the initial separated fat layer was suctioned out of the cooker.

The meat mixture was once again agitated for a short period of 10 seconds, and after changing suction hoses, any remaining fat and broth layer was removed from the cooker through suction tubes 16 and 16'

Finally, the hoses were attached to the screened suction tubes 14 and 14', and after a further 10 second agitation, approximately half of the remaining broth in the meat mixture was suctioned off.

The fat separation process removed 87.8 lbs. of fat and 176 lb. of broth from the meat mixture, and was completed in 6 to 7 minutes.

The fat separation apparatus was then manually removed from the cooker, and approximately 45 lbs. of seasoning/water absorption mixture was added to the remaining meat/broth mixture in approximately four equal portions. In this example, a "taco" flavoring was used and the water absorber was a mixture of oat flakes and oat fiber. The ribbon agitators 40, 40' were used to disperse and thoroughly mix the seasoning/water absorbents with the meat and broth in the cooker.

Upon completion of the thorough mixing, the entire meat/seasoning mixture was reheated to a temperature of 165° F. to 170° F. The meat was then removed through ports 38, 38'.

This particular experimental run produced 498 lbs. of cooked seasoned low fat ground meat having a fat content of 7.4%.

Example 2

Experiments were undertaken to determine the fat content and yield of cooked ground meat remaining after efficient removal of the liquid phase produced during cooking. The meat for these experiments was cooked in an open aluminum pan approximately 17 inches wide by 20 inches long, constructed with approximately 6 inch high side walls surrounding the entire flat pan surface.

A 3/32 inch wide slit approximately 8 inches long was machined along the lower front edge of the pan at the intersection of the flat pan surface and the front side wall surface.

A small collection trough was attached to the underside of the pan in the location of the slit. This trough was designed to collect any liquid passing out of the pan through the above-mentioned slit, and to convey the exiting liquid through a flexible tube to an external collection vessel where the volume of exiting liquid could be measured.

The modified cooking pan was placed on a commercial gas fired kitchen stove and the edge of the pan opposite from the slit was elevated above the level of the slit edge. In this manner liquid fat and broth produced during the cooking of ground meat in the pan could flow towards the slit opening and exit the pan thereby separating from the cooking meat.

Prior experiments had demonstrated that a 3/32 inch slit was sufficiently small to prevent plugging by raw or cooked meat particles, but sufficiently large not to impede the flow of liquid through the slit.

Several experiments, using ground meat of different fat content, were performed using this cooking pan and liquid separation device. In all cases, approximately 10 lbs. of ground meat was placed in the pan and cooked on the gas flame stove, with continuous manual agitation by a rake like device to assure uniform cooking.

A 10 lb. batch of meat generally took approximately 15 minutes to cook to a temperature greater than 165° F.

After about 7 to 8 minutes into the cooking cycle, liquid broth and fat started to drain out through the slit and was continuously collected in the measuring vessel. Liquid fat and broth continued to drain from the meat for an additional approximately 3 minutes, even after the cooking process was terminated.

Once the liquid essentially stopped draining from the pan, the volume of fat (which floated on the broth) and the volume of broth were noted.

Table 3 presents the results of four fat separation experiments using raw meats of different starting percent fat content. For each experimental run, Table 3 indicates the initial weight and fat content of the raw meat used. The table then summarizes the quantity of fat and broth drained from the cooked meat and the yield and fat content of the cooked meat produced in each of the particular experimental runs. The grams of fat remaining in the cooked meat per 100 grams of raw meat cooked was then derived from the cooked meat yield and fat content.

TABLE 3

SUMMARY OF FAT SEPARATION STUDIES UTILIZING GROUND MEAT WITH DIFFERENT FAT CONTENTS

| | RAW MEAT | | DRAINED LIQUID | | COOKED MEAT | | GMS FAT PER 100 |
|---|---|---|---|---|---|---|---|
| RUN NO. | STARTING WT. GMS | % FAT | FAT Ml | BROTH Ml | YIELD %* | % FAT | GMS OF RAW MEAT USED IN COOKING** |
| 1. | 4550 | 24.24 | 775 | 465 | 65 | 12.28 | 7.98 |
| 2. | 4562 | 20.0 | 667 | 577 | 67 | 12.06 | 8.09 |
| 3. | 4559 | 13.21 | 215 | 635 | 73 | 10.14 | 7.39 |
| 4. | 4562 | 11.19 | 145 | 590 | 76 | 11.08 | 8.39 |

*% Yield = [Cooked meat weight after draining/starting raw meat weight] × 100

Figure 4:
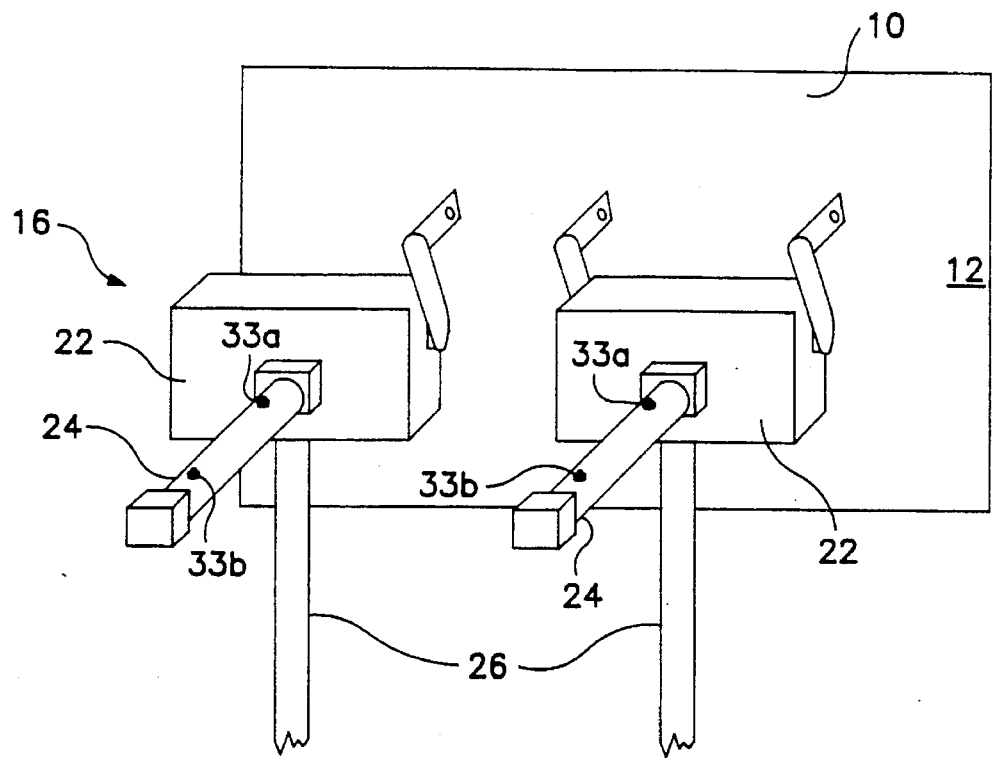
FIG. 4 is a graph depicting the yield and fat percent of cooked ground meat produced from raw ground meat of varying percent fat contents.
Figure 6:
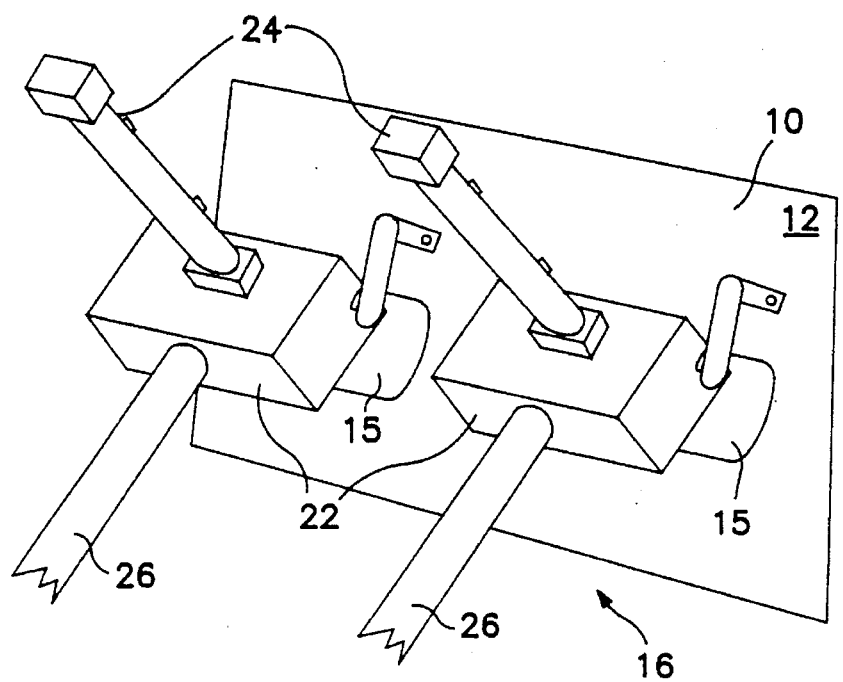
Figure 5A:
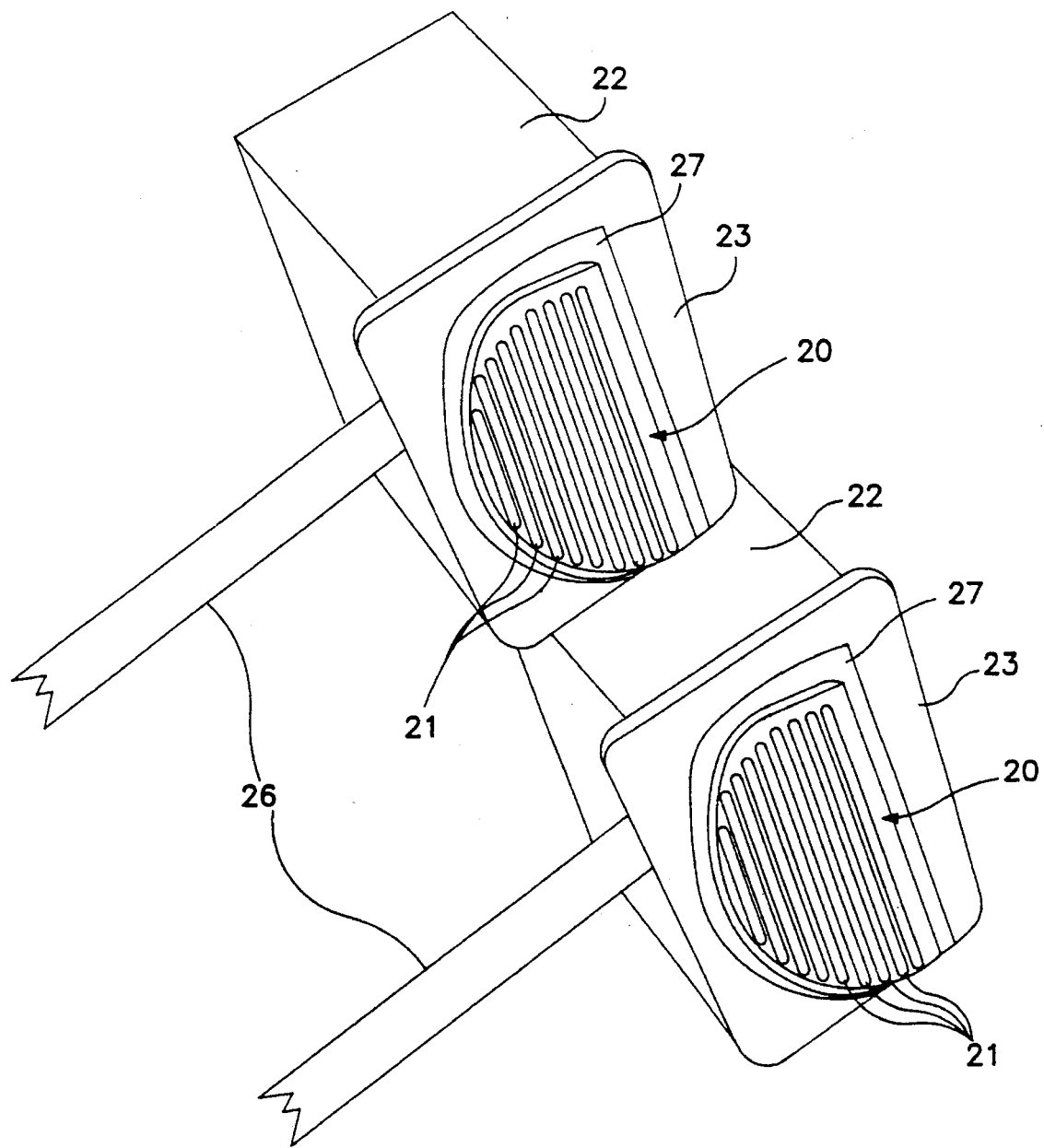
FIG. 5 is a graph illustrating the uniformity of absolute fat content in cooked ground meat made from raw ground meat of varying percent fat contents.
Figure 5B:
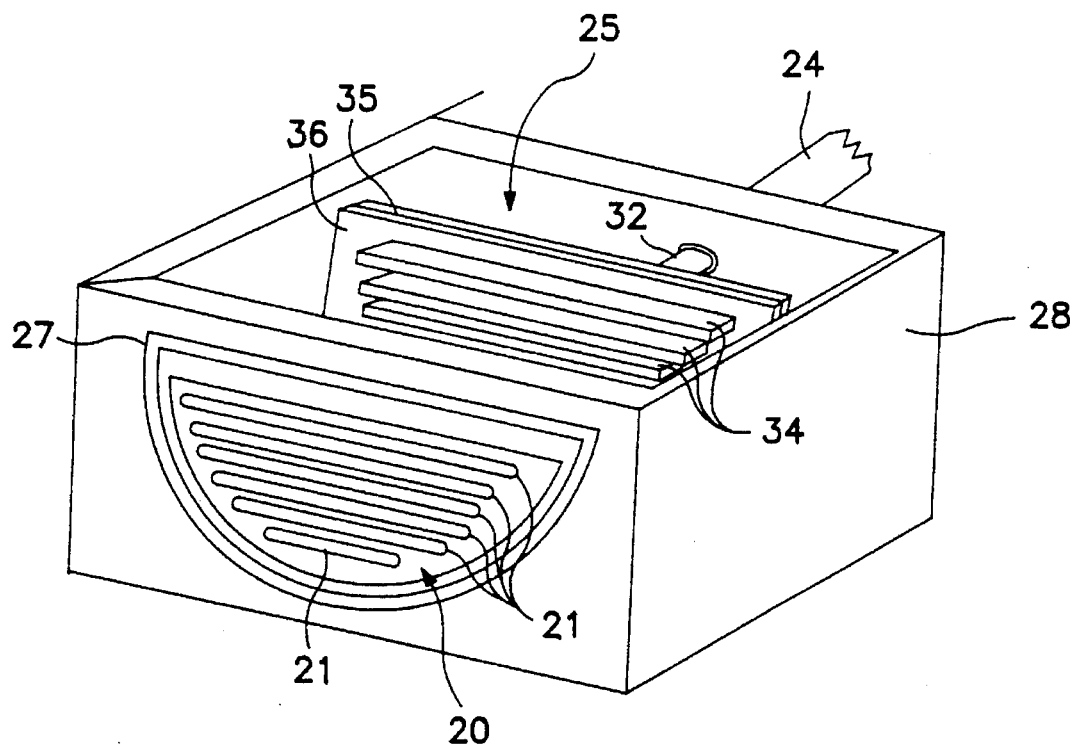
Figure 5C:
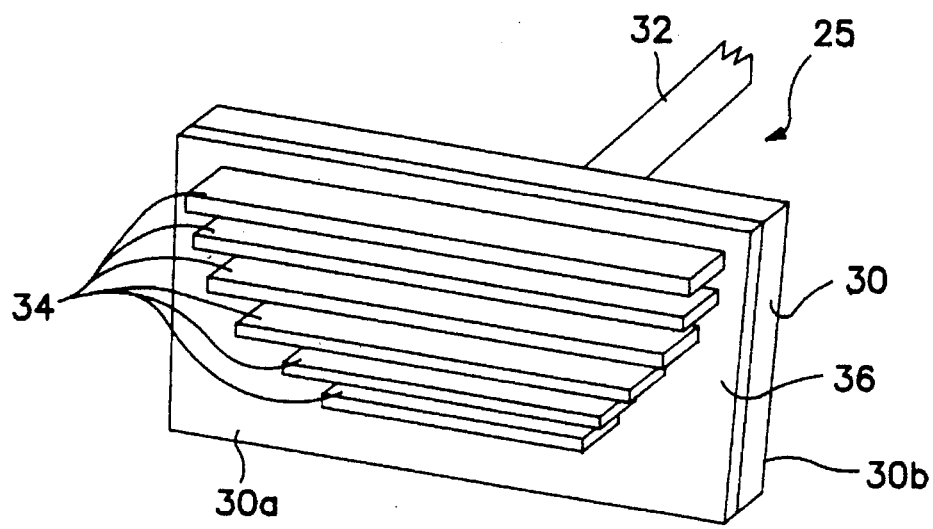
Figure 7:
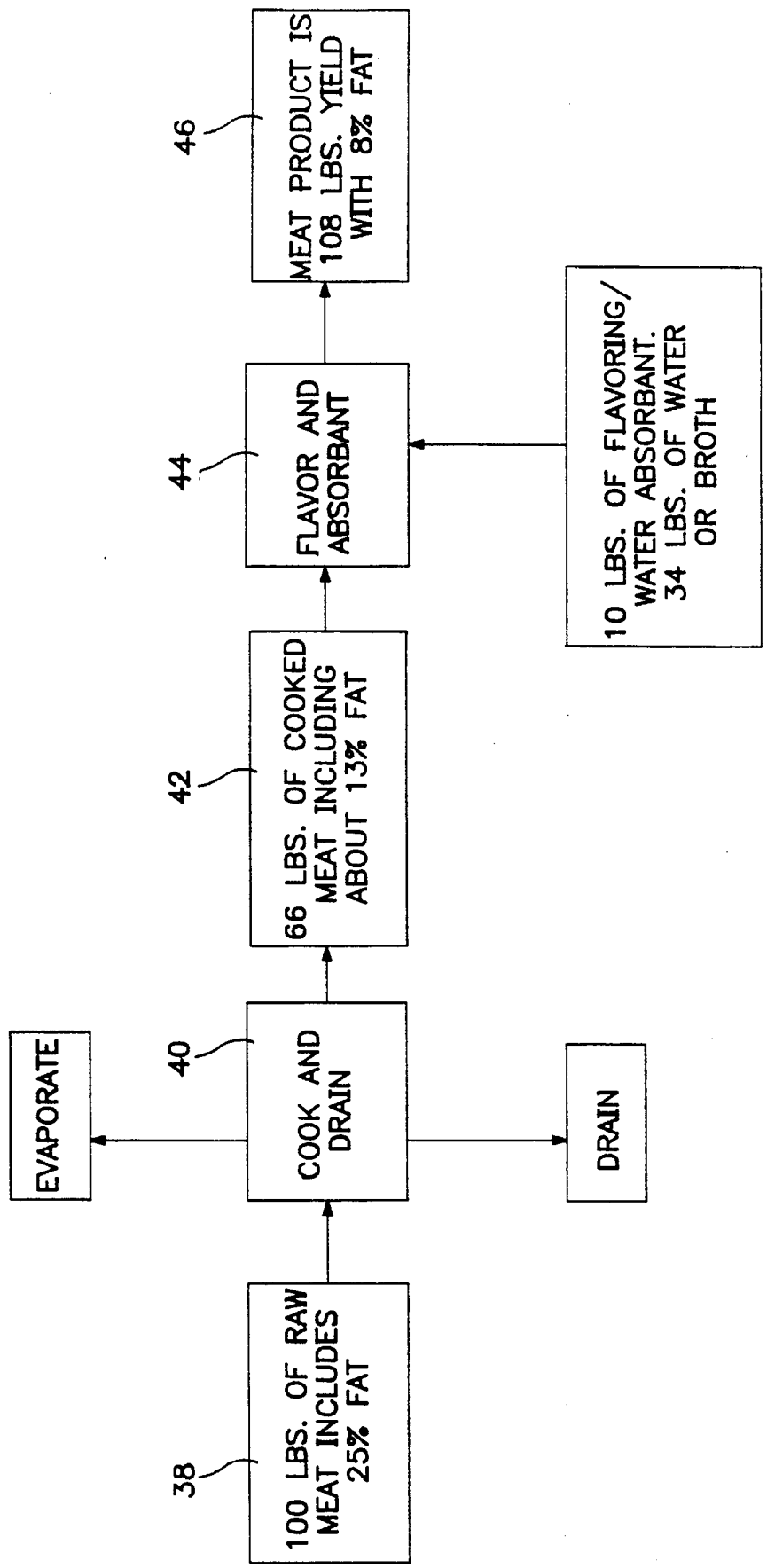
Figure 8:
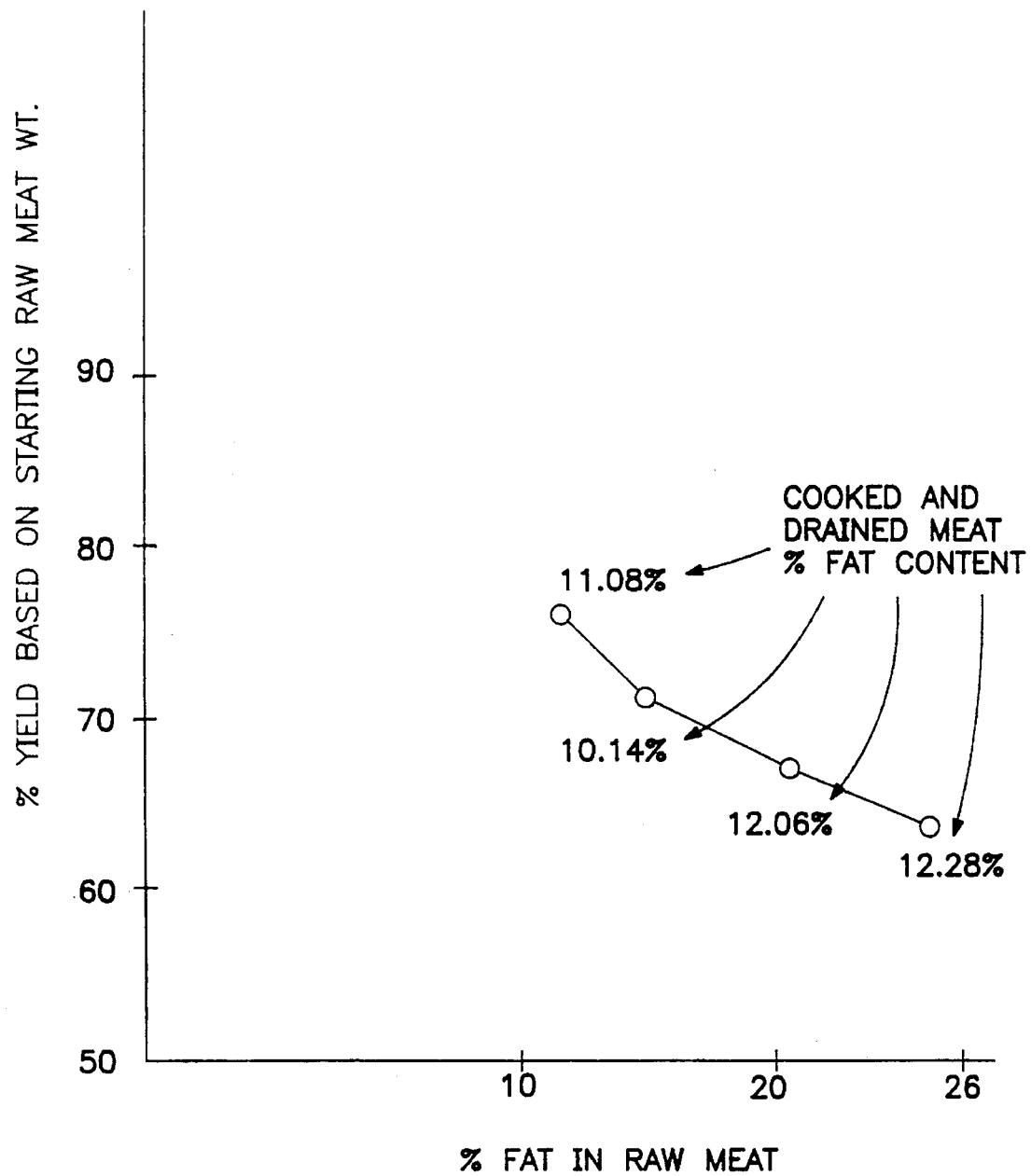
Figure 9:
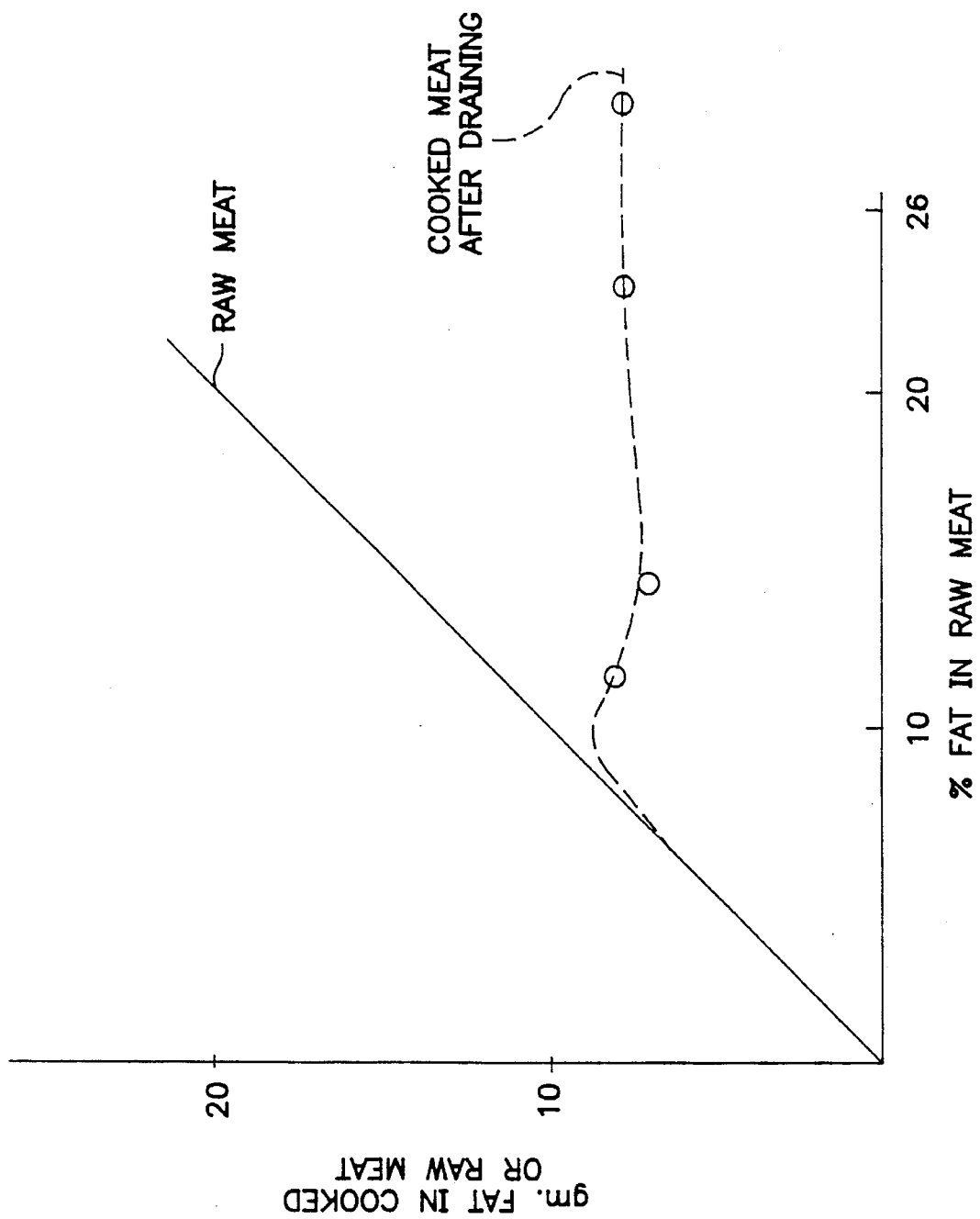
Figure 10:
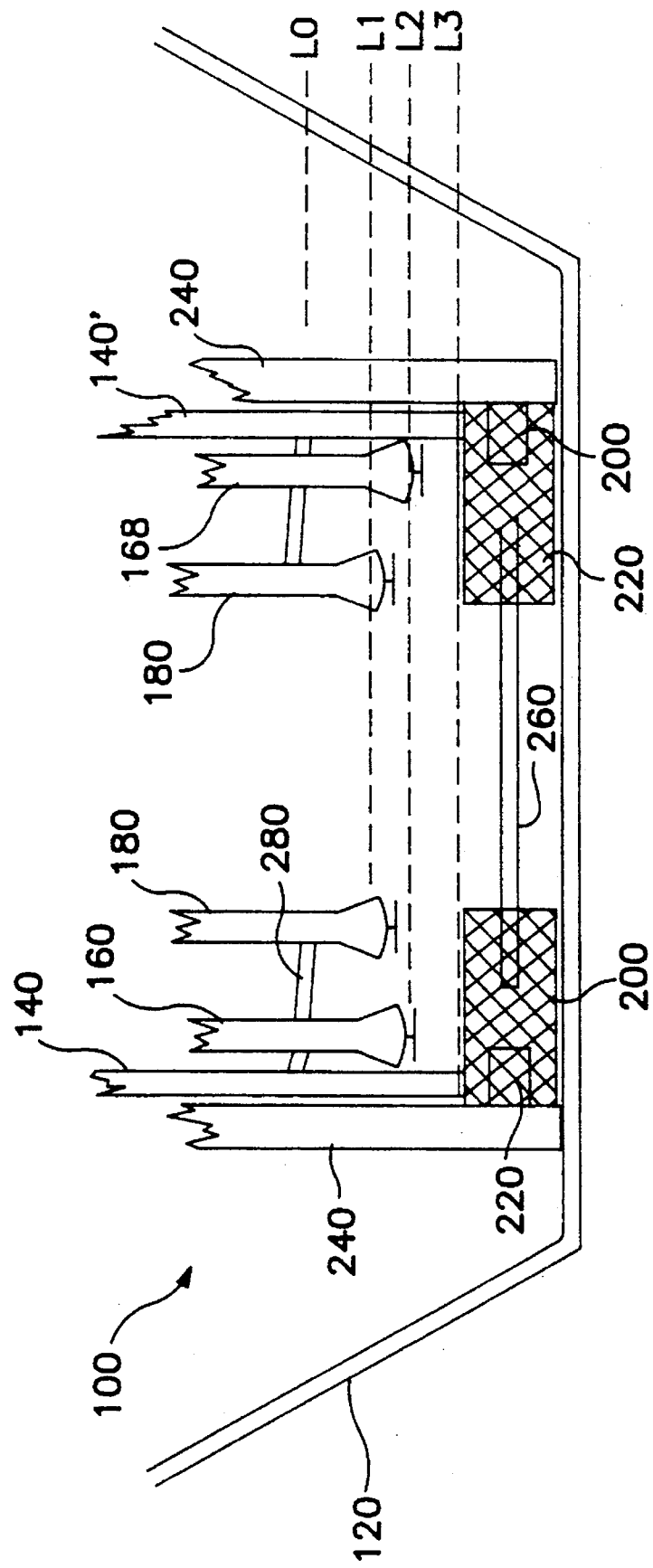
Figure 11:
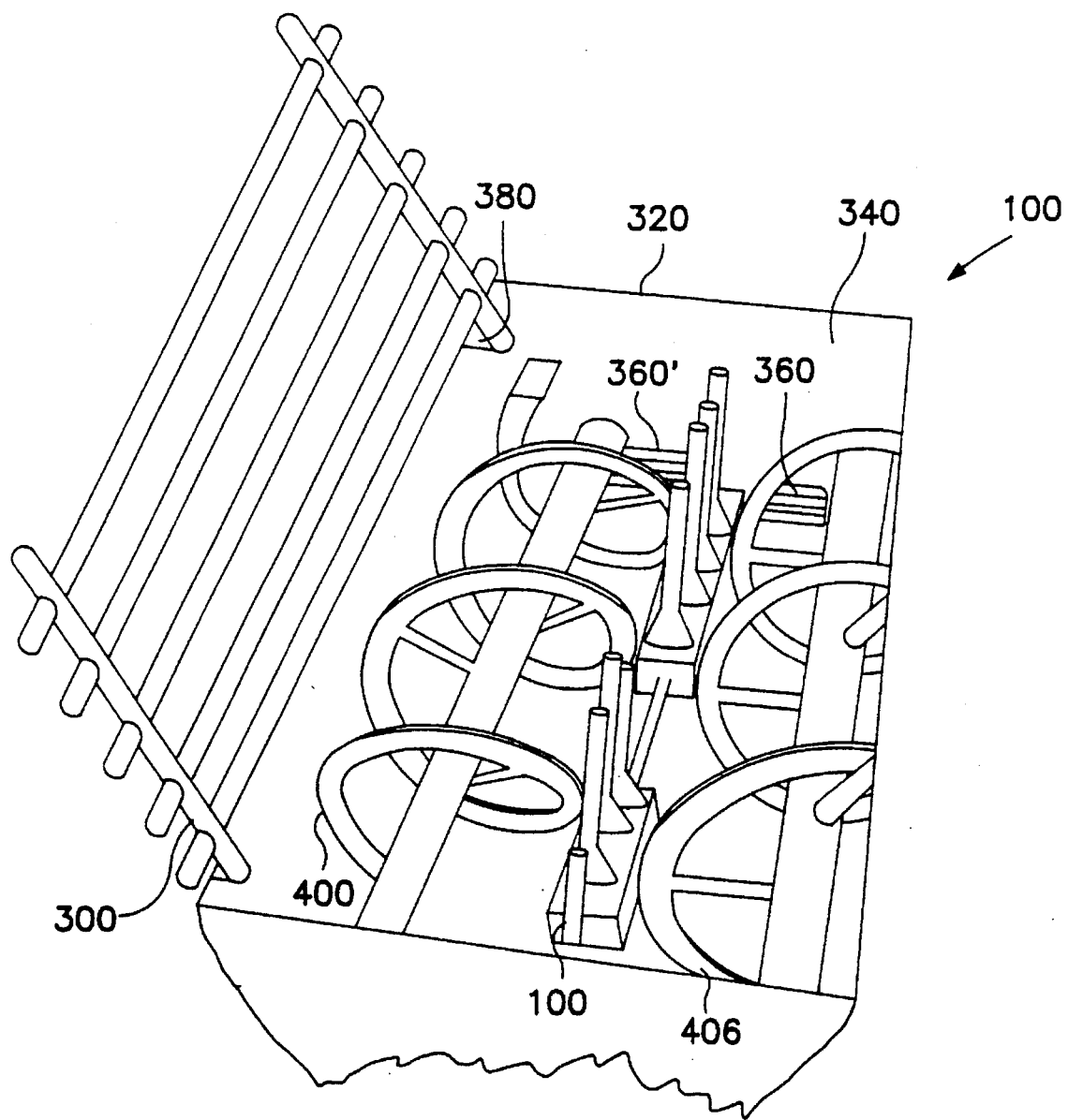
Figure 12:
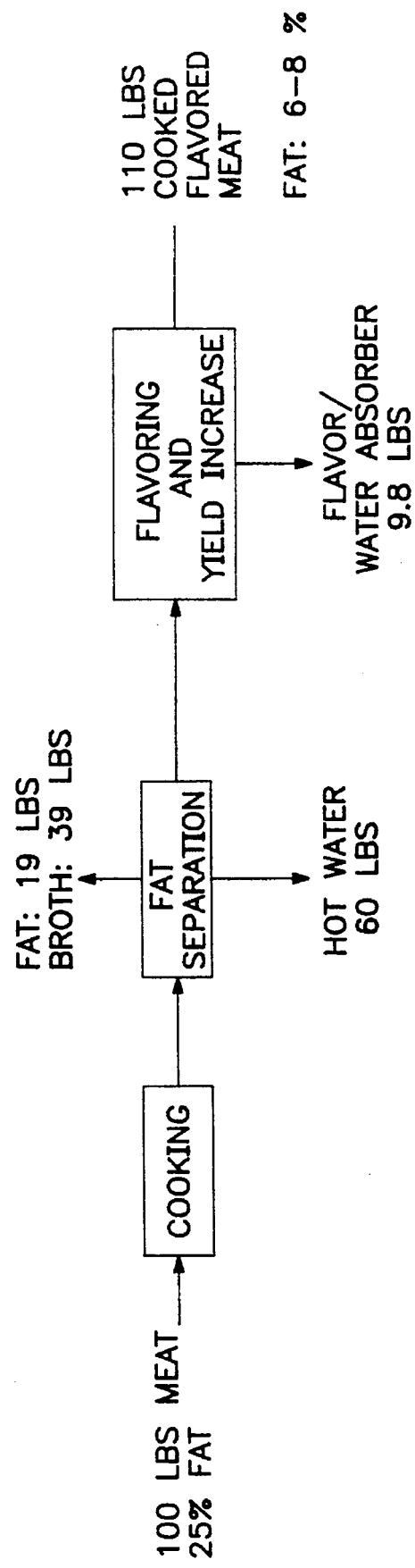

**gms fat/100 gm starting raw meat used in cooking = $\dfrac{\% \text{ Yield} \times \text{Cooked Meat } \% \text{ fat}}{100}$ FIG. 4 and 5 present the data of Table 3 in graphical form. FIG. 4 is a plot of cooked meat yield vs. percent initial percent fat (by weight) in the starting raw meat. For each different starting raw meat fat content, FIG. 4 also presents the final cooked and drained meat fat content (also by weight).

FIG. 5 plots the fat content (in grams of fat) for either raw meat or cooked meat after liquid separation, against the percent fat in the raw meat used to produce the cooked and drained meat.

From these experiments one can see that by the use of the present invention:

1. Low fat ground meat (with a fat % ranging from 10% by weight to 12% by weight) can be produced from almost any percent fat starting raw ground meat, provided that the rendered fat can be separated from the cooked mixture. (FIG. 4)
2. The low fat ground meat remaining after separation of the liquid phase, contains about 8 gms. of fat for every 100 gms of raw ground meat cooked, irrespective of the fat percent of the raw meat. (FIG. 5)
3. The yield of low fat ground meat remaining after separation of the liquid ranges from 65% to 75%, and is lower the higher the fat content of starting raw meat. (FIG. 4)

Example 3

The meat employed in this example was ground beef having an initial weight of 586 gms. and an initial fat concentration of approximately 25% by weight.

The meat was cooked in a standard kitchen electrically heated skillet (manufactured by Westbend) set at 265 degrees F. for a period of 5 to 5.5 minutes.

The entire cooked meat/liquified fat/broth mixture was then rapidly transferred to a large funnel, in the neck of which was placed a small screen (screen hole size of approximately 1/32 inch by 1/32 inch). The screen restrained the meat particles, but allowed the liquified fat and broth to drain from the meat and be collected in a measuring cylinder placed below the outlet of the funnel.

After all the liquid had stopped draining from the meat, 98 ml. of fat and 50 ml. of broth were collected in the measuring cylinder, leaving 398 gms of cooked and drained meat.

The "packed" bed density of the cooked and drained meat was then measured by placing 300 gms. of cooked meat in a beaker. The meat occupied 450 to 460 ml., resulting in a packed density of 0.66 gms./ml. This is in contrast to the solid density of cooked and drained meat which is 1.07 gms./ml. (as discussed earlier).

The "free or open" volume of a packed bed of 398 gms. of cooked, drained ground meat is therefore:

398×[1/0.66−1/1.07]=225 ml.

The volume of liquid separated (148 ml.) and evaporated (approx. 586−[398+148]) is 188 ml.

Thus it can be confirmed that the "free" volume produced during cooking of ground meat is essentially filled by liquified fat and broth, provided water evaporation is kept to a minimum.

Although the foregoing describes the invention with preferred embodiments, this is not intended to limit the invention. Rather, the foregoing is intended to cover all modifications and alternative constructions falling within the spirit and scope of the invention as expressed in the appended claims.

What is claimed is:

1. A method for producing low fat, chunky ground meat comprising the steps of:
   (a) placing raw ground meat in a cooking vessel;
   (b) cooking the raw ground meat in the cooking vessel so as to form a mixture that includes cooked ground meat defining a layer having an upper region and a lower region, liquified fat and broth;
   (c) adding hot water, at a temperature greater than about 180° F., to the mixture in the cooking vessel produced in step (b), in an amount less than the weight of the raw ground meat, but in an amount sufficient to cause a significant percentage of the liquified fat to float in a layer above the mixture;
   (d) removing the liquified fat layer from the cooking vessel from a location above the upper region of the cooked meat; and
   (e) removing sufficient remaining broth and water from the mixture in the cooking vessel from a location below the lower region of the cooked meat such that a cooked, low fat, chunky ground meat product is produced.

2. A method for producing low fat, cooked meat product with a high yield weight, comprising the steps of:
   (a) placing raw ground meat in a cooking vessel;
   (b) cooking the raw ground meat in the cooking vessel so as to form a mixture that includes cooked ground meat defining a layer having an upper region and a lower region, liquified fat and broth;
   (c) adding hot water, at a temperature greater than about 180° F., to the mixture in the cooking vessel produced in step (b), the amount of water being sufficient to cause a significant percentage of the liquified fat to float in a layer above the mixture;
   (d) removing the liquified fat layer from the cooking vessel from a location above the upper region of the cooked meat;
   (e) removing a portion of the broth and water from the mixture in the cooking vessel from a location below the lower region of the cooked meat such that a cooked, low fat, chunky ground meat product is produced; and then
   (f) adding a water absorbent compound to the cooked meat in the cooking vessel produced in step (e).

3. The method according to claim 2 wherein the water absorbent compound is selected from the group consisting of oat flakes, oat fibers, high water absorbing fibers, and cereals, and mixtures thereof.

4. The method according to claim 2, wherein sufficient water absorbent compound is added such that water and broth are retained in the cooked meat product whereby the weight of the cooked meat product is approximately equal to the weight of the raw ground meat in step (a).

5. The method according to claim 2 wherein a flavoring agent is added in step (f).

6. The method according to claim 5 wherein the flavoring agent is a taco flavor.

7. The method according to claim 5 wherein the amount of water and broth which remains in the cooked meat mixture after step (d) is sufficient such that, after adding the water absorbent compound and flavoring agent, the final weight yield of the product in step (f) is approximately equal to the weight of the raw ground meat in step (a).

8. The method according to claim 2 wherein sufficient water is added to cause at least 60% by weight of the fat in the raw meat to float above the meat mixture.

* * * * *